(12) United States Patent
Arel et al.

(10) Patent No.: US 10,559,299 B1
(45) Date of Patent: Feb. 11, 2020

(54) RECONCILIATION BETWEEN SIMULATOR AND SPEECH RECOGNITION OUTPUT USING SEQUENCE-TO-SEQUENCE MAPPING

(71) Applicant: Apprente LLC, Mountain View, CA (US)

(72) Inventors: Itamar Arel, Los Altos, CA (US); Joshua Benjamin Looks, Palo Alto, CA (US); Ali Ziaei, Redwood City, CA (US); Michael Lefkowitz, San Francisco, CA (US)

(73) Assignee: Apprente LLC, Mountain View, CA (US)

( * ) Notice: Subject to any disclaimer, the term of this patent is extended or adjusted under 35 U.S.C. 154(b) by 0 days.

(21) Appl. No.: 16/436,704

(22) Filed: Jun. 10, 2019

Related U.S. Application Data

(62) Division of application No. 16/215,484, filed on Dec. 10, 2018.

(51) Int. Cl.
  *G01L 15/00* (2006.01)
  *G10L 15/06* (2013.01)
  (Continued)

(52) U.S. Cl.
  CPC ............ *G10L 15/063* (2013.01); *G06N 20/00* (2019.01); *G10L 15/02* (2013.01);
  (Continued)

(58) Field of Classification Search
  CPC .................. G10L 15/063; G10L 15/02; G10L 2015/0635; G10L 2015/027; G10L 2015/025; G06N 20/00
  (Continued)

(56) References Cited

U.S. PATENT DOCUMENTS

| 6,622,121 B1 | 9/2003 | Crepy et al. |
| 7,133,827 B1 | 11/2006 | Gillick et al. |

(Continued)

OTHER PUBLICATIONS

Jung, Sangkeun, et al., "Data-Driven User Simulation for Automated Evaluation of Spoken Dialog Systems", ScienceDirect, Computer Speech & Language 23, accepted Mar. 6, 2009, available online Mar. 19, 2009, pp. 479-509.

(Continued)

*Primary Examiner* — Thierry L Pham
(74) *Attorney, Agent, or Firm* — Lowenstein Sandler LLP

(57) ABSTRACT

A synthetic training data item comprising a first sequence of symbols that represent a synthetic sentence output by a simulator is received. The synthetic training data item is processed using a machine learning model, which outputs a second sequence of symbols that represent the synthetic sentence. The synthetic training data item is modified by replacing the first sequence of symbols with the second sequence of symbols. A statistically significant mismatch exists between the first sequence of symbols and a third sequence of symbols that would be output by an acoustic model that processes a set of acoustic features that represent an utterance of the synthetic sentence, and no statistically significant mismatch exists between the second sequence of symbols and the third sequence of symbols. The modified synthetic training data item may be used to train a second machine learning model that processes data output by the acoustic model.

20 Claims, 8 Drawing Sheets

(51) Int. Cl.
*G06N 20/00* (2019.01)
*G10L 15/02* (2006.01)

(52) U.S. Cl.
CPC .. *G10L 2015/025* (2013.01); *G10L 2015/027* (2013.01); *G10L 2015/0635* (2013.01)

(58) Field of Classification Search
USPC ........................................................ 704/244
See application file for complete search history.

(56) References Cited

U.S. PATENT DOCUMENTS

| | | |
|---|---|---|
| 7,684,988 B2 | 3/2010 | Barquilla |
| 10,134,388 B1 | 11/2018 | Lilly |
| 2006/0190252 A1 | 8/2006 | Starkie |
| 2006/0206332 A1 | 9/2006 | Paek et al. |
| 2009/0306995 A1 | 12/2009 | Weng et al. |
| 2010/0063823 A1 | 3/2010 | Wu et al. |
| 2013/0018649 A1 | 1/2013 | Deshmukh et al. |
| 2015/0261745 A1 | 9/2015 | Song et al. |
| 2017/0018270 A1 | 1/2017 | Min |
| 2018/0143967 A1 | 5/2018 | Anbazhagan et al. |
| 2018/0247640 A1 | 8/2018 | Yassa et al. |

OTHER PUBLICATIONS

Pietquin, Olivier, and Dutoit, Thierry, "A Probabilistic Framework for Dialog Simulation and Optimal Strategy Learning", IEEE Transactions on Audio, Speech, and Language Processing vol. 14, No. 2, Mar. 2006, pp. 589-599.

Wang, Chao, et al., "Language Model Data Filtering via User Simulation and Dialogue Resynthesis", Interspeech 2005, Ninth European Conference on Speech Communication and Technology, Lisbon, Portual, Sep. 4-8, 2005, pp. 21-24.

Chung, Grace, et al., "Automatic Induction of Language Model Data for Spoken Dialogue System", ISCA Archive, 6th GIGdial Workshop on Discourse and Dialogue, Lisbon, Portugal, Sep. 2-3, 2005, 10 pages.

RECONCILIATION BETWEEN SIMULATOR AND SPEECH RECOGNITION OUTPUT USING SEQUENCE-TO-SEQUENCE MAPPING

RELATED APPLICATIONS

The present application is a divisional of U.S. patent application Ser. No. 16/215,484, filed Dec. 10, 2018, which is incorporated by reference herein.

TECHNICAL FIELD

This disclosure relates to the field of artificial intelligence and machine learning, and in particular to a sequence to sequence converter comprising a machine learning model that reconciles outputs of an acoustic model with outputs of a simulator.

BACKGROUND

A conversational agent is a software program that interprets and responds to statements made by users in ordinary natural language. Examples of conversational agents include Microsoft® Cortana®, Apple® Siri®, Amazon® Alexa® and Google® Assistant®. A traditional conversational agent includes an automatic speech recognition (ASR) system that receives an audio waveform and performs feature extraction to convert the audio waveform into sequences of acoustic features. The traditional ASR system includes an acoustic model (AM) and a language model (LM). The AM determines the likelihood of a senone from these acoustic features, where each senone is a triphone, while the LM determines the a priori likelihood of a sequences of words. The AM uses a pronunciation lexicon to select a maximally likely sequence of words given the input (e.g., acts as a speech transcription engine). The sequences of text output by the ASR are the input into a natural language understanding (NLU) system, which determines a speaker's intent based on the text output by the ASR. The speaker's determined intent is then input into a dialog management system that determines one or more actions to perform to satisfy the determined intent.

Often there is insufficient real world data to properly train an ASR system and/or NLU system. Accordingly, synthetic training data in some instances is generated to train the ASR system and/or the NLU system. For example, the LM of an ASR may be trained on a combination of real data and simulated training data. However, synthetic training data generated by a simulator is often substantially different from real world data that the ASR system and NLU system will operate on. Such a mismatch between training data and real world data (e.g., data used in testing and/or field application) degrades performance of the ASR system and/or NLU system. Such mismatches can be caused, for example, by variability in noise, reverb, speaker gender, age, accent, and so on. Additionally, people naturally use non-standard grammar when they speak in many situations, and make performance errors such as frequent stops, restarts, incomplete utterances, corrections, "ums", "ands", and so on that make it very challenging for the NLU to determine the correct speaker intent if its design is based on clear, grammatically correct, error-free speech. These phenomena often cause conversational agents to incorrectly determine speaker intent or fail to determine speaker intent.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1A:
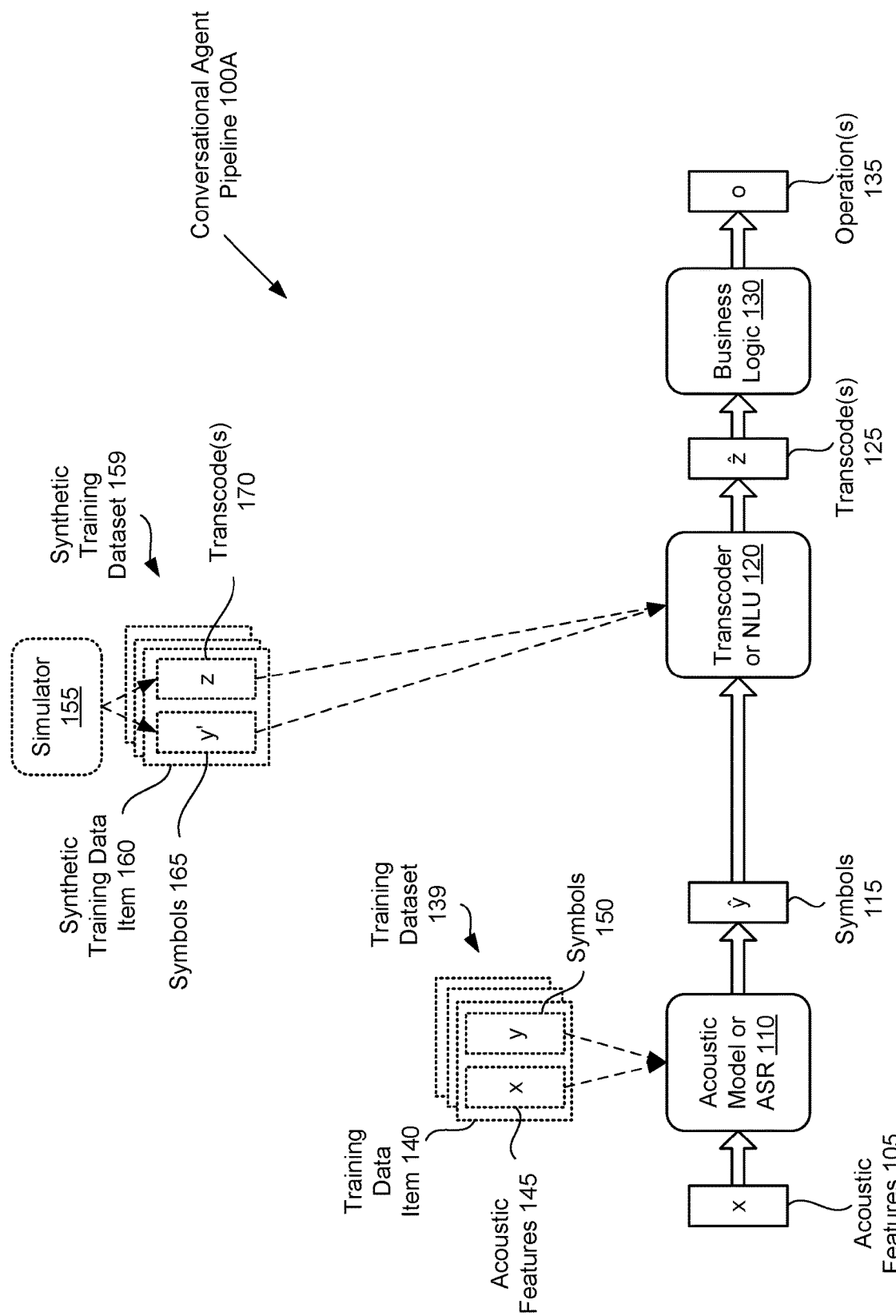
FIG. 1A is a block diagram illustrating a conversational agent pipeline with a transcoder or NLU that has been trained using synthetic training data, in accordance with embodiments of the present disclosure.

Embodiments of the present disclosure relate to a sequence to sequence converter (also referred to herein as a symbol to symbol converter, reconciler or simulator to acoustic model reconciler) that reconciles the output of a simulator (e.g., sequences of symbols such as words, syllables or phonemes in synthetic training data items) with the output of an acoustic model or ASR (e.g., sequences of symbols such as words, syllables or phonemes). The sequence to sequence converter converts sequences of symbols in simulated training data to new sequences of symbols that more closely match the output of an acoustic model or ASR. The simulated training data may be modified by replacing the original sequences of symbols with the new sequences of symbols. The modified training data may then be used to train a transcoder or NLU. There may be a statistically significant mismatch between the initial sequences of symbols in the synthetic training data items and sequences of symbols output by the acoustic model or ASR. This mismatch means that the data that the transcoder or NLU is trained on is different from the data that the transcoder or NLU receives during operation. Such a mismatch may significantly lower an accuracy of the transcoder or NLU to properly determine an intent, action and/or entity from sequences of symbols that are based on real world user utterances. However, by applying the sequence to sequence converter (reconciler) to synthetic data used to train the NLU or transcoder, the sequences of symbols in modified training data items may have no statistically significant mismatch with sequences of symbols produced by the acoustic model or ASR.

A conversational agent described in embodiments includes an acoustic model (AM) and/or a linguistic model (ML), a transcoder, and a business logic system arranged in a pipeline. The acoustic model is trained to receive an input comprising acoustic features from an audio waveform that represents an utterance of a speaker and to output a sequence of phonemes (the basic building blocks of speech) that represent the utterance of the speaker. The sequences of phonemes may be represented by sequences of vectors that include phoneme probability distributions. The acoustic model may also optionally output sequences of non-phonemic or prosodic features along with the sequence of phonemes. Some examples of such features include pitch, volume, duration, and so on. The phonemes (e.g., which may include vectors of phoneme probability distributions) and/or non-phonemic or prosodic features output by the acoustic model may occur at regular and/or irregular intervals.

The sequence of phonemes (e.g., which may include sequences of vectors representing phoneme probability distributions) and/or non-phonemic features output by the acoustic model may be input into the transcoder, which is trained to receive sequences of phonemes and to output core inferences about intent (referred to herein as transcodes) based on the sequences of phonemes. The determined intent (transcodes) may include one or more requested actions (e.g., add an item to an order, cancel an order, remove an item from an order, modify an item from an order) and one or more entities (e.g., nouns) associated with the one or more actions (e.g., a hamburger, a pickle, a drink, a particular plane flight, and so on). Notably, the transcoder described in some embodiments operates on sequences of phonemes rather than on text.

In other embodiments, a conversational agent pipeline includes a traditional ASR and NLU. A conversational agent may receive an audio waveform at an ASR system, and perform feature extraction to convert the audio waveform into sequences of acoustic features by the ASR system, which may include an acoustic model (AM) and a language model (LM). The AM determines the likelihood of the mapping from these acoustic features to various hypothesized sequences of phonemes, while the LM determines the a priori likelihood of sequences of words. The AM may include a pronunciation lexicon to select a maximally likely sequence of words given the input (e.g., acts as a speech transcription engine). The sequences of text output by the ASR are then input into an NLU system, which determines a speaker's intent based on the text output by the ASR. The speaker's determined intent is then input into a dialog management system that determines one or more actions to perform to satisfy the determined intent.

In embodiments, the transcodes output by the transcoder or NLU are input into a business logic system or layer. The business logic system may include one or more rules that check the transcodes for inconsistencies and/or errors (e.g., such as a diet coke ordered with mayonnaise, or a multiple identical articles ordered in a short time frame). The business logic resolves any identified inconsistencies and/or errors, and then performs one or more operations to satisfy the actions in the transcodes, such as adding items to an order.

The transcoder and/or NLU may be trained using synthetic training data that has been processed by a reconciler (sequence to sequence converter) that causes the sequences of symbols in the training data to more closely resemble sequences of symbols output by the AM or ASR during operation.

Some embodiments are described with reference to a conversational agent pipeline that includes an acoustic model that outputs sequences of phonemes and a transcoder that takes sequences of phonemes as an input. In such embodiments, a phoneme to phoneme converter may be used to convert sequences of phonemes in simulated training data items into sequences of phonemes that are similar to sequences of phonemes output by the acoustic model to train the transcoder. For example, in the real world people might say or pronounce things differently than is specified in a dictionary used to create synthetic training data items, and the phoneme to phoneme converter may convert phonemes in simulated data with phonemes from real world speech. However, it should be understood that the sequence to sequence converter (e.g., the phoneme to phoneme converter) described in embodiments that include a transcoder that operates at the phoneme level also applies to traditional conversational agents that include an ASR and NLU and that operate on the word level. For such embodiments, a sequence to sequence converter may convert text or sequences of words in a simulated training data item with text or sequences of words that have a closer match to text or sequences of words that are output by the ASR during use. Additionally, the sequence to sequence converter may also be used for other conversational agents and/or other systems that train a machine learning model using synthetic data with sequences of symbols that may be different from sequences of symbols derived from real world data that the systems will operate on. The sequences of symbols may be sequences of phonemes, sequences of words, sequences of syllables, and so on.

In some embodiments, the conversational agent pipeline may operate in a restricted domain. There may be limited data items (or no data items) within the restricted domain that are suitable for training the transcoder or NLU of the conversational agent pipeline. Accordingly, in some embodiments a conversational simulator generates synthetic training data items for training the transcoder. The synthetic training data items may comprise a) a textual representation of a synthetic sentence and b) a transcoding of the synthetic sentence comprising one or more actions and one or more entities associated with the one or more actions included in the synthetic sentence. The synthetic sentence and associated transcodes may be within a restricted domain within which the conversational agent will function. For each synthetic training data item, a grapheme to phoneme converter may convert the textual representation of the synthetic sentence into a sequence of phonemes that represent the synthetic sentence. Accordingly, the data items in the second training dataset may include a) sequences phonemes that represent synthetic sentences and b) sequences of transcodes of the synthetic sentences. A phoneme to phoneme converter may then convert the sequences of phonemes into new sequences of phonemes that more closely match possible outputs of the acoustic model. The new sequences of phonemes may be used as the inputs into the transcoder during training, and the transcodes may be labels or targets associated with the sequences of phonemes. The transcoder may therefore be trained on synthetic training data generated using domain specific information and/or stochastic grammar rules and including sequences of phonemes that have been output by a phoneme to phoneme converter. This enables a large range of possible utterances to be generated, potentially covering the entire range of possibilities within the restricted domain, which include sequences of phonemes that closely match those that might be output by the acoustic model. As a result, the transcoder may be robust, and may be trained to accurately determine speaker intent within the restricted domain even when the original audio includes acoustic noise, reverberations, distortions, accents and non-standard grammar such as stops, restarts, incomplete utterances, corrections, "ums", "ands", and so on in an utterance.

Referring now to the figures, FIG. 1A is a block diagram illustrating a conversational agent pipeline 100A that includes a transcoder or NLU 120 that has been trained using synthetic training dataset 159, in accordance with embodiments of the present disclosure. The conversational agent pipeline 100A may include an acoustic model (AM) 110, a transcoder 120 and a business logic 130 (also referred to as a business logic system or business logic layer). Alternatively, the conversational agent pipeline 100A may include an ASR 110, an NLU 120 and the business logic 130.

The acoustic model 110 may be a machine learning model (or arrangement of multiple machine learning models) that has been trained to generate sequences of phonemes (labeled as symbols ($\hat{y}$) 115) from acoustic features (x) 105 extracted from audio data of utterances (e.g., from one or more speakers). The term "symbols" is used herein as a shorthand for "sequences of symbols" (e.g., such as sequences of phonemes, sequences of subphonemes, sequences of morphemes, sequences of words, etc.). Though embodiments are discussed with reference to sequences of phonemes (labeled as symbols), it should be understood that such embodiments also apply to other sequences of symbols. The transcoder 120 may be another machine learning model (or arrangement of multiple machine learning models) that determines speaker intent based on sequences of phonemes (e.g., symbols ($\hat{y}$) 115). The intent may be represented as one or more transcodes ($\hat{z}$) 125 comprising actions and associated entities. The transcodes ($\hat{z}$) 125 may be input into the business logic 130, which may determine one or more operations (o) 135 to perform to satisfy the intent represented by the one or more transcodes ($\hat{z}$) 125 (e.g., to perform one or more actions identified in the transcodes ($\hat{z}$) 125).

The conversational agent 100A in some embodiments does not include an ASR or other language model that determines the probability of specific sequences of words. Instead, the acoustic model 110 outputs sequences of phonemes rather than sequences of words, and the transcoder 120 determines intent based on sequences of phonemes rather than based on sequences of words. In some embodiments, the AM includes a language model. However, in such embodiments the AM still outputs phonemes rather than text. Using phonemes rather than words has multiple benefits. First, by using phonemes, multiple subsystems may be eliminated, reducing an amount of compute resources, memory resources and/or network bandwidth resources that are used by the conversational agent pipeline 100A. Additionally, by using phoneme level information rather than word level information, the output domain of the acoustic model 110 is reduced from thousands of possibilities (e.g., around 180,000 words for the English language) to less than 100 possibilities (e.g., 39 phonemes in the Carnegie Mellon University Pronouncing Dictionary). Accordingly, at the phoneme level 39 different phonemes can be used to represent all of the words in the English dictionary. Additionally, the phonemes can also cover any utterances, including those with out-of-lexicon words and phrases which may not be included in any language dictionary. Standard ASRs and NLUs that operate at the word level may fail when words not in a dictionary are used, precisely because they must map all or most of the input to text. However, the conversational agent pipeline 100A is able to accurately determine speaker intent even when such out of lexicon words are used in utterances.

The acoustic model 110 may output phonemes and/or non-phonemic or prosodic features at regular or irregular intervals. For example, the acoustic model 110 may output sequences of phonemes (and optionally non-phonemic or prosodic features) at regular or irregular intervals, where a distinct phoneme (or vector of phoneme probabilities) is output at each interval. The output phoneme for a time interval may be a single phoneme that had the highest probability of being correct. In one embodiment, the output phoneme is a sparse vector that includes a separate element for each phoneme. The output phoneme may have a 1 value associated with the winning phoneme with the highest probability and 0 values associated with the other phonemes. Alternatively, the output phoneme may be a vector that may include probabilities for some or all of the possible phonemes. For example, an output of the acoustic model 110 may be a sequence of vectors (e.g., 39 element vectors if CMU phonemes are used with no non-phonemic features), where each vector includes a probability value for each of the elements (e.g., 10% probability of a first phoneme, 90% probability of a second vector, and 0% probability of remaining phonemes; [0.1, 0.9, 0, . . . , 0]). In one embodiment, the sequence of phonemes is represented as a lattice that includes a series of alignment values (e.g., 0, 1, 2, 3, etc.) that each represent a time step, where each alignment value is associated with a sparse vector with a value of 1 for a winning phoneme class and values of 0 for the remaining phoneme classes. In one embodiment the sequence of phonemes is represented as a lattice that includes a series of alignment values (e.g., 0, 1, 2, 3, etc.) that each represent a regular or irregular time step, where each alignment value is associated with a phonetic posteriorgram. A phonetic posteriorgram is defined by a probability vector representing the posterior probabilities of a set of pre-defined phonetic classes (e.g., the 39 CMU phoneme classes) for speech frames (e.g., from a window of speech frames).

In one embodiment, the acoustic model 110 is a hidden Markov model (HMM) that maps audio data inputs (e.g., acoustic features such as MFCCs extracted from audio way) into sequences of phonemes, such as those described above. An HMM is a statistical Markov model in which the system being modeled is assumed to be a Markov process with hidden states. A Markov model is a stochastic model used to model randomly changing systems. A hidden Markov model models the state of a system with a random variable that changes over time, where the state is only partially observable. In other words, observations are related to the state of the system, but they are typically insufficient to precisely determine the state of the system. For example, for the HMM, observed data is the embedding (e.g., MFCCs and/or other acoustic features) of a speech audio waveform and the hidden state is the spoken phonemes.

In one embodiment, the acoustic model 110 is a trained neural network, such as a recurrent neural network (RNN). An RNN is a type of neural network that includes a memory to enable the neural network to capture temporal dependencies. An RNN is able to learn input-output mappings that depend on both a current input and past inputs. RNNs may be trained using a training dataset to generate a fixed number of outputs (e.g., to classify time varying data such as audio data as belonging to a fixed number of classes such as phoneme classes). One type of RNN that may be used is a long short term memory (LSTM) neural network. In one embodiment, a six layer LSTM is used.

In one embodiment, the acoustic model 110 is a combination of a neural network (e.g., an RNN) and a hidden markov model. In one embodiment, the acoustic model has two main parts, including a Hidden Markov Model (HMM) and a Long Short Term Memory (LSTM) inside the HMM which models feature statistics. Alternatively, the AM may be based on a combination of a Gaussian Mixture Model (GMM) and an HMM (e.g., a GMM-HMM). In one embodiment, the acoustic model 110 is an implementation based on the Kaldi® framework to output phonemes (and optionally non-phonemic or prosodic features) rather than text. Other machine learning models may also be used for the acoustic model 110.

The transcoder 120 is a machine learning model trained to generate transcodes ($\hat{z}$) 125 from sequences of phonemes (e.g., symbols ($\hat{y}$) 115). The transcoder 120 may be or include a neural network. In one embodiment, the transcoder 120 is a recurrent neural network. In one embodiment, the transcoder 120 is an LSTM that uses a connectionist temporal classification (CTC) loss function.

The transcoder 120 receives a sequence of phonemes (e.g., symbols ($\hat{y}$) 115) as an input and outputs one or more transcodes ($\hat{z}$) 125, where the transcodes ($\hat{z}$) 125 represent an inference of intent associated with the utterance captured in the acoustic features (x) 105 of original audio data. The set of possible transcodes that may be output by the transcoder 120 may depend on the restricted domain for which the conversational agent pipeline 100A is trained. The same acoustic model 110 may be used across different conversational agent pipelines in different domains, but the transcoders 120 may be used for a particular domain in embodiments. In the example of fast food ordering, the possible actions for the transcodes may include add entity to order, remove entity from order and modify entity. The possible entities that may be added to the order may be based on a menu associated with a fast food restaurant. Each entry may be associated with additional entities, such as size entities, component/ingredient entities, and so on. For example, a hamburger entity may be associated with sub-entities of meat, ketchup, mustard, mayonnaise, onion, lettuce and pickles, and any of these sub-entities may be added, removed or modified as well as the hamburger entity.

In an example, the acoustic features 105 may be extracted from a waveform of an utterance that states, "can I please have a hamburger with no pickles, oh, and please add extra onions." The acoustic model 110 may receive the acoustic features (e.g., an embedding including NIFCCs) 105 for such audio data as an input, and may output a sequence of phonemes as follows:"k ah n ay p l iy z hh ae v ah hh ae m b er g er w ih th n ow p ih k ah l z ow ae n d p l iy z ae d eh k s t er ah n y ah n z." This sequence of phonemes (e.g., symbols ($\hat{y}$) 115) may then be input into the transcoder 120, which may output one or more transcodes ($\hat{z}$) 125 that represent the intent of the original utterance. For example, the transcoder 120 may output a sequence of transcodes as follows: {[orded], [hamburger], [remove], [pickles], [add], [onions] }.

The transcodes ($\hat{z}$) 125 output by the transcoder 120 are input into the business logic 130. The business logic 130 may make final decisions based on the transcodes ($\hat{z}$) 125. The business logic 130 may perform one or more operations or actions (o) 135 to satisfy the intent associated with the transcodes ($\hat{z}$) 125. In the above example, the business logic 130 may add a hamburger to an order, and may specify that the hamburger is to have no pickles and extra onions in the order. In some embodiments, the business logic 130 may include a rules engine that applies one or more rules to the transcodes. The business logic 130 may then perform one or more operations based on whether or not the rule or rules are satisfied. In one embodiment, the business logic 130 includes one or more rules that determine whether the transcodes ($\hat{z}$) 125 make sense and/or whether multiple identical entities have been ordered consecutively. In one embodiment, the business logic 130 includes one or more rules for producing follow-up questions to output to a speaker if the transcodes indicate an impossible or ambiguous intent.

In one embodiment, the ASR 110 may be a machine learning model (or arrangement of multiple machine learning models) that has been trained to generate sequences of words (e.g., symbols ($\hat{y}$) 115) from acoustic features 105 extracted from audio data of utterances (e.g., from one or more speakers). The NLU 120 may be another machine learning model (or arrangement of multiple machine learning models) that determines speaker intent based on sequences of words (e.g., symbols ($\hat{y}$) 115). The intent may be represented as one or more transcodes ($\hat{z}$) 125 comprising actions and associated entities. The transcodes ($\hat{z}$) 125 may be input into the business logic 130, which may determine one or more operations 135 to perform to satisfy the intent represented by the one or more transcodes ($\hat{z}$) 125 (e.g., to perform one or more actions or operations (o) 135 identified in the transcodes ($\hat{z}$) 125).

In embodiments the acoustic model or ASR 110 is trained using a training dataset 139. The training data items 140 in the training dataset 139 may be or include real world data. For example available training datasets 139 for training speech recognition systems (such as the Common Voice and Libre Speech datasets) may be used, which may include audio data and associated text transcriptions of the audio data. For each of the training data items 140 in the training dataset 139, acoustic features (x) may be extracted from the audio data of the training data item 140. The training data item 140 may then include the acoustic features (x) 145 and sequences of symbols (y) 150. The sequences of symbols (y) may be sequences of words, sequences of syllables, sequences of phonemes, and so on. In some instances, the sequences of symbols 150 are initially sequences of words, but are transformed into sequences of phonemes using a grapheme to phoneme converter.

Since the acoustic features 145 and the acoustic features 105 are both from real world utterances, they are both represented with (x). Additionally, the acoustic features 145 and associated sequences of symbols 150 are used to train the acoustic model or ASR 110. Accordingly, the sequence of symbols ($\hat{y}$) 115 output by the acoustic model or ASR 110 is statistically similar to sequences of symbols 150 of training data items 140 in the training dataset 139 that have similar acoustic features 145 to acoustic features 105.

However, in the illustrated conversational agent pipeline 100A the training dataset 139 is not used to train the transcoder or NLU 120 because the training dataset 139 may not be in a domain in which the transcoder or NLU 120 will operate, or because there is otherwise insufficient data in the training dataset 139 for training the transcoder or NLU 120. Accordingly, the transcoder or NLU 120 is trained using a synthetic training dataset 159 that includes synthetic training data items 160 output by a simulator 155. Synthetic training data items 160 may include sequences of symbols (y') and sequences of transcodes (z) 170. The sequences of symbols 165 may be, for example, sequences of words, sequences of syllables, sequences of phonemes, etc. In one embodiment, the simulator 155 generates synthetic training data items 160 that include sequences of words, and the sequences of words are transformed into sequences of phonemes using a grapheme to phoneme converter.

The sequences of symbols (y') 165 in the synthetic training data items 160 generated by the simulator 155 (and optionally modified by a grapheme to phoneme converter) may differ in a statistically significant way from the sequences of symbols (y) 150 in the training data items 140 of the training dataset 139 and from the sequences of symbols (ŷ) 115 output by the acoustic model or ASR 110. This may be caused, for example, if pronunciations of words in the synthetic training dataset 159 are different from the pronunciation of words in the training dataset 139. Accordingly, there may be statistically significant differences between the sequences of symbols 165 in the synthetic training data items 160 used to train the transcoder or NLU 120 and the sequences of symbols 115 that the transcoder or NLU actually receives during operation. Such a mismatch between sequences of symbols 165 and sequences of symbols 115 can cause a degradation in the accuracy of transcodes 125 (e.g., a degradation of up to 50% in some instances). In other words, the mismatch between the training data and the actual data received during operation may cause the transcoder or NLU 120 to incorrectly determine a speaker intent, or to fail to determine a speaker intent.

Figure 1B:
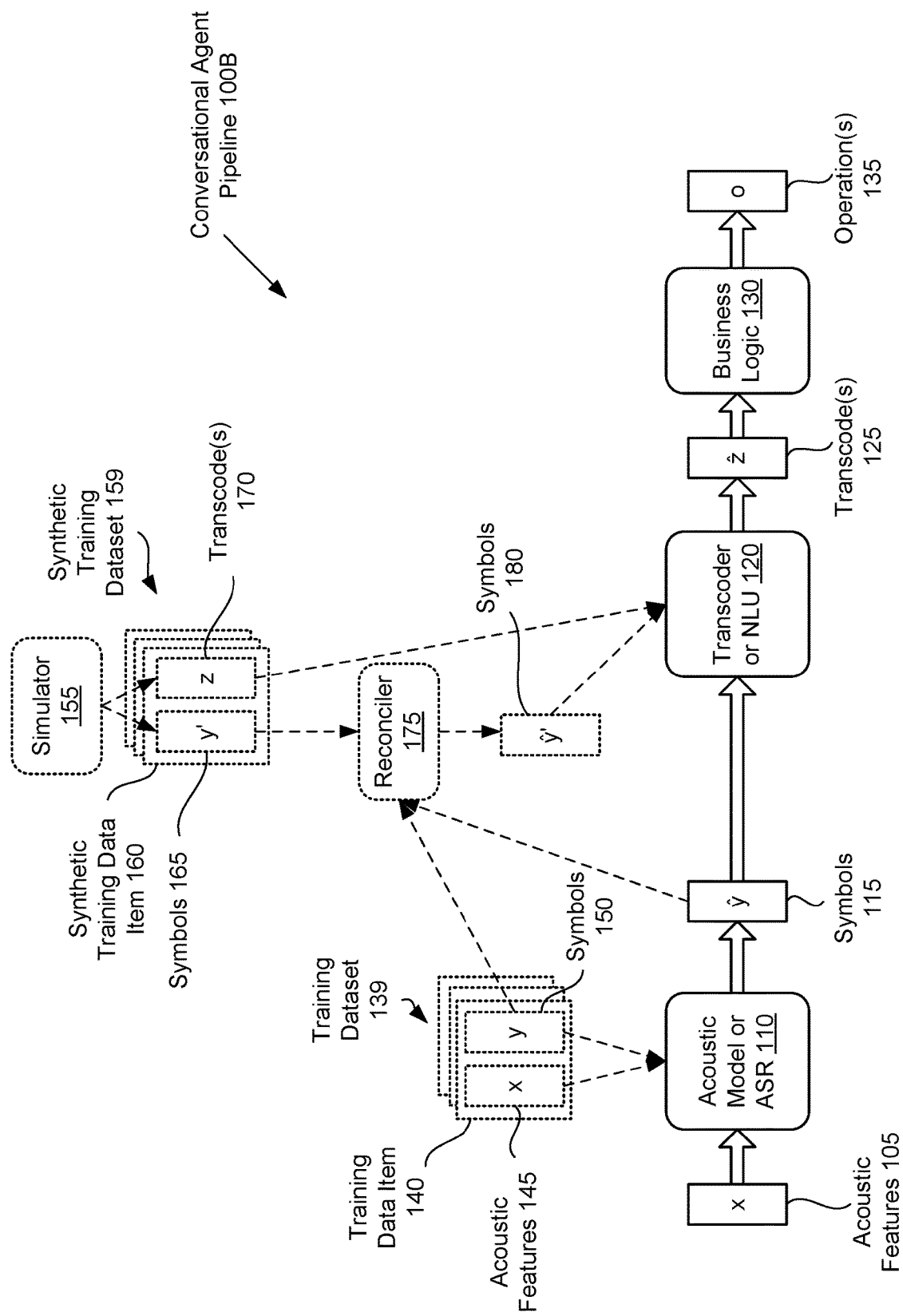
FIG. 1B is a block diagram illustrating a conversational agent pipeline with a transcoder or NLU that has been trained using synthetic training data that has been processed by a reconciler (sequence to sequence converter), in accordance with embodiments of the present disclosure.

FIG. 1B is a block diagram illustrating a conversational agent pipeline 100B that includes a transcoder or NLU 120 that has been trained using a synthetic training dataset 159 that has been processed by a reconciler (sequence to sequence converter) 175, in accordance with embodiments of the present disclosure. The conversational agent pipeline 100B may be substantially similar to conversational agent pipeline 100A, and may include the AM or ASR 110, the transcoder or NLU 120 and the business logic 130. However, the transcoder or NLU 120 in the conversational agent pipeline 100B has been trained on a synthetic training dataset 159 including synthetic training data items 160 that have been modified by a reconciler (sequence to sequence converter) 175.

The reconciler 175 comprises a machine learning model that has been trained to receive a sequence of symbols (y') 165 as input and to output a new sequence of symbols (ŷ') 180, where the new sequence of symbols (ŷ') 180 as statistically similar to sequences of symbols (ŷ) 115 that might be output by the acoustic model or ASR 110. Accordingly, the reconciler 175 is trained to perform a mapping between synthetic clean sequences of symbols (as output by a simulator 155) for a synthetic utterance that may not be realistic and realistic sequences of phonemes that would closely correspond to what the acoustic model or ASR 110 would output for a similar utterance. As a result, the transcoder or NLU 120 is trained using data representative of the same acoustic model or ASR 110 that the transcoder or NLU 120 will receive inputs from during operation.

The reconciler 175 in one embodiment comprises a recurrent neural network (RNN). In one embodiment, the reconciler 175 comprises an encoder-decoder recurrent neural network. For example, the encoder-decoder may include a first long short-term memory (LSTM) machine learning model that collapses an input vector of any length (input sequence of phonemes and/or i-vector) into an a first output vector of fixed dimension and a second LSTM machine learning model that expands the first output vector of the fixed dimension into a second output vector (output sequence of phonemes). In one embodiment, the reconciler 175 comprises an RNN that comprises a transformer/attention model. In one embodiment, the reconciler 175 is a generative adversarial network (GAN) or other generative machine learning model.

The reconciler 175 may be trained using a modified training dataset 139 that includes pairs of symbols 150 and associated symbols 115. To generate the modified training dataset, training data items 140 in training dataset 139 may be processed by acoustic model or ASR 110 to output symbols 115. For each training data item 140 in the training dataset 139, the acoustic features 145 may be removed and the symbols 115 may be added. The sequences of symbols 150 may be used as the input to the reconciler 175 during training, and the sequences of symbols 115 may be used as a target output during training. Accordingly, for modified training data items 140 from the modified training dataset 139, the first sequence of symbols 150 may be input into the reconciler 175 during training, and the associated second sequence of symbols 115 may be used as a target to adjust weights of nodes in the reconciler 175.

In some embodiments, another machine learning model or feature extractor (not shown) may process the acoustic features 145 to generate one or more vectors that represent speaker characteristics, noise characteristics, microphone characteristics and/or channel characteristics. For example, the other machine learning model or feature extractor may generate an identity vector (i-vector) from each set of acoustic features 145. I-vectors may capture, for example, accents, speech patterns, speed of speech, and/or other speaker characteristics and/or audio characteristics (e.g., gender, age, microphone, etc.). The i-vectors may be added to the respective training data items, and a data item input to the reconciler 175 during training may include an i-vector (or one or more other vectors) as well as a set of symbols 150. I-vectors and/or one or more other vectors representing speaker characteristics, noise characteristics, microphone characteristics and/or channel characteristics may be added to synthetic training data items 160. This may train the reconciler 175 to output symbols 180 that are representative of particular ones or combinations of speaker characteristics, noise characteristics, microphone characteristics and/or channel characteristics. For example, if the transcoder or NLU 120 is to be trained for use in a drive through restaurant in a particular geographic location, an i-vector may be generated that is representative of speakers from that geographic location. Such an i-vector may be generated by extracting i-vectors from speech of one or more speakers from that geographic location. These i-vectors may then be added to the synthetic training data items 160 that are input into the reconciler 175 to produce sequences of symbols 180 that are representative of the speakers from the geographic location. These sequences of symbols and associated transcodes 170 may then be input into the transcoder or NLU 120 during training of the transcoder or NLU 120, which will train the transcoder or NLU 120 to determine intent for speakers of that particular geographic area.

In another embodiment, labels representing speaker characteristics such as labels of gender, age, nationality, geographic region, etc.) may be determined for training data items and then added to those training data items. These labels may then be used as further inputs into the reconciler 175 to train the reconciler 175 to output sequences of phonemes that are representative of speakers associated with those labels.

Use of the reconciler 175 to modify synthetic training data items 160 that are used to train the transcoder or NLU 120 can drastically improve the performance of the transcoder or NLU 120. For example, accuracy of the transcoder or NLU 120 has been shown to improve by 20-40% in experiments with use of the reconciler 175.

Figure 2A:
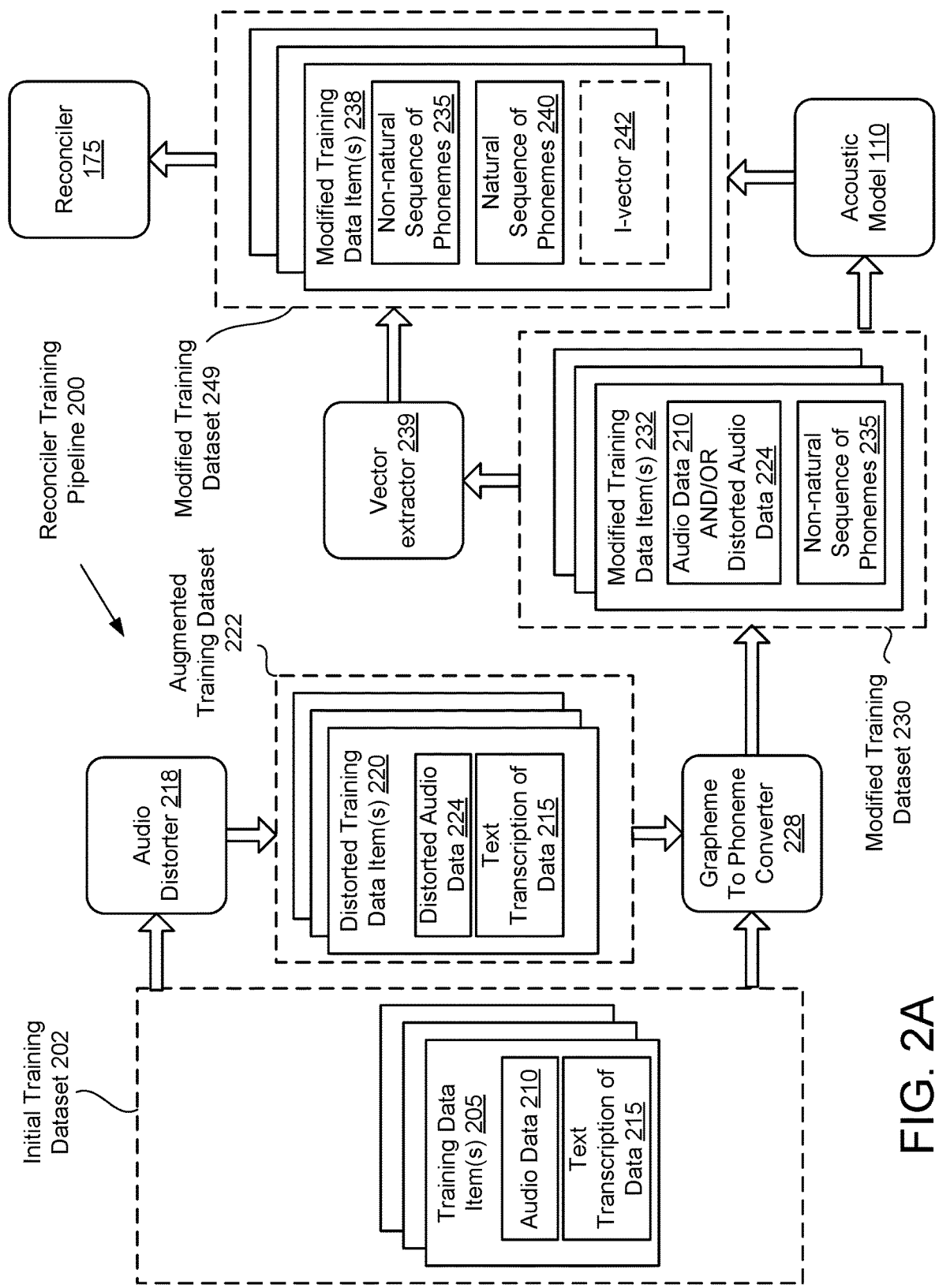
FIG. 2A is a block diagram illustrating a reconciler (sequence to sequence converter) training pipeline, in accordance with embodiments of the present disclosure.

FIG. 2A is a block diagram illustrating a reconciler (sequence to sequence converter) training pipeline 200, in accordance with embodiments of the present disclosure. The reconciler training pipeline 200 includes reconciler 175 that outputs sequences of symbols (e.g., sequences of phonemes) based on inputs of other sequences of symbols (e.g., other sequences of phonemes). The reconciler training pipeline 200 is described with reference to a reconciler 175 that operates as a phoneme to phoneme converter. However, it should be understood that similar reconciler training pipelines 200 may also be used to train reconcilers which are sequence to sequence converters that operate on symbols other than phonemes (e.g., that operate on sequences of words and/or sequences of syllables).

In order for the reconciler 175 to be trained to output sequences of phonemes (e.g., sequences of vectors representing phoneme probabilities), a training dataset (modified training dataset 249) should include data items (e.g., modified training data items 238) that include both first sequences of phonemes 235 (or sequences of other symbols) and second sequences of phonemes 240 (or other sequences of symbols).

To produce such a modified training dataset 249, an initial training dataset 202 is selected. The initial training dataset 202 may be, for example, the Common Voice and/or Libre Speech dataset. Training data items 205 in the initial training dataset 202 may include audio data 210 and associated text transcriptions (sequences of words) 215 of the audio data. The initial training dataset 202 may correspond to the same training dataset that may have been used to train the acoustic model 110 to output sequences of phonemes (or other symbols) from audio features extracted from audio data 210.

In embodiments, the text transcriptions 215 of the training data items 205 in the initial training dataset 202 are input into a grapheme to phoneme converter 228 that converts the text transcriptions 215 into first sequences of phonemes 235. In one embodiment, the grapheme to phoneme converter 228 is a machine learning model that has been trained to convert text (graphemes) into phonemes. In one embodiment, the grapheme to phoneme converter 228 is a neural network. For example, the grapheme to phoneme converter 228 may be an RNN or a hidden Markov model. In one embodiment, the grapheme to phoneme converter 228 includes a lookup table that maps text into phonemes. For example, the lookup table may include an English language dictionary, where each word in the dictionary includes the phoneme sequence associated with that word. Accordingly, the grapheme to phoneme converter 228 may find a word from input text on the table, determine the sequence of phonemes for that word of text, and output the determined sequence of phonemes.

The initial training dataset 202 may include data that lacks background noise, vibrations, reverberations, distortions, and so on. However, audio data that is received by the conversational agent 100B during use may include such background noise, distortions, reverberations, and so on. Accordingly, in order to train the acoustic model 110 to accurately determine phonemes even with such distortions and other noise and reverberation, training data items 205 from the initial training dataset 202 may be input into an audio distorter 218. Audio distorter 218 may augment the audio data 210 of the training data items 205 by adding background music, background noise, reverberations, and so on to the audio data 210, resulting in a distorted or augmented training dataset 222 that includes distorted/augmented training data items 220 with distorted audio data 224.

Distorted training data items 220 and training data items 205 may be input into the grapheme to phoneme converter 228 to generate non-natural sequences of phonemes 235, where the non-natural sequences of phonemes are an artificial or mechanical text transcription mapped through the grapheme to phoneme converter 228, and do not necessarily sound like sequences of phonemes that a person would utter. The initial training dataset 202 and/or augmented training dataset 222 may then be modified by replacing the text transcription of data 215 with the non-natural sequences of phonemes 235 to produce a modified training dataset 230. The modified training dataset 230 may then include modified training data items 232 that each include respective audio data 210 (e.g., acoustic features/embeddings) and/or distorted audio data 224 (e.g., acoustic features/embeddings) and respective non-natural sequences of phonemes 235.

Modified training data items 232 from the modified training dataset 230 may be input into the acoustic model 110. The acoustic model 110 may then output a natural sequence of phonemes for each respective modified training data item 232 based on input audio data (e.g., acoustic features extracted from an audio file) 210 and/or distorted audio data 224), where the natural sequences of phonemes 235 sound like sequences of phonemes that a person would utter and is a hypothesis output by the trained acoustic model 110. The output of the acoustic model 110 may then be used to further modify the modified training data items 232, resulting in modified training data items 238. In embodiments, modified training data items 232 are modified by removing the audio data 210 and/or distorted audio data 224 and adding the natural sequence of phonemes 240. Accordingly, modified training data items 238 include the non-natural sequence of phonemes 235 and the natural sequence of phonemes 240. The modified training data items 238 from the modified training dataset 249 are then used to train the reconciler 175. For example, for each augmented training data item 238, the non-natural sequence of phonemes 235 may be input into the reconciler 175 for training of the reconciler 175 to produce the associated natural sequence of phonemes 240.

The natural sequences of phonemes 240 output by the acoustic model 110 generally will not match the non-natural sequences of phonemes 235 output by the grapheme to phoneme converter 228 (e.g., have a statistically significant mismatch therebetween). However, the grapheme to phoneme converter 228 may be a same grapheme to phoneme converter that is used on simulated data items used to train the transcoder 120. Accordingly, if a mapping can be determined between the output of the grapheme to phoneme converter (non-natural sequence of phonemes 235) to the output of the acoustic model 110 (natural sequence of phonemes 235), then this mapping can be used to cause sequences of phonemes generated by the grapheme to phoneme converter 228 of simulated data to be statistically similar to the sequences of phonemes output by acoustic model 110 during operation of the conversational agent pipeline 100B. Thus, the reconciler 175 may be trained to bridge the gap between the output of the grapheme to phoneme converter 228 and the output of the acoustic model 110.

In some embodiments, the modified training data items 238 may be further modified by adding i-vectors 242 or other vectors that are representative of speaker characteristics, noise characteristics, microphone characteristics and/or channel characteristics to the modified training data items 238. To generate the i-vectors 242, the audio data 210 and/or distorted audio data 224 may be input into a vector extractor 239 (e.g., an i-vector extractor), which may determine an i-vector 242 and/or other vectors based on the audio data 210 and/or distorted audio data 224. Other vectors that the vector extractor 239 may be trained to extract include vectors representing age, microphone, accent, gender, geographic location of speaker, speaking speed/rate, and so on. In one embodiment, the vector extractor 239 includes a machine learning model trained to extract an i-vector from audio data (e.g., from acoustic features of audio data). In one embodiment, the vector extractor 239 includes one or more machine learning models, where each machine learning model may be trained to determine a particular characteristic or set of characteristics of a speaker (e.g., such as gender, age, national origin, speaking rate/speed, etc.).

The i-vector 242 (and/or other vectors) generated from the audio data 210 or distorted audio data 224 of a modified training data item 232 may be added to an associated modified training data item 238. These i-vectors 242 (and/or other vectors), first sequences of phonemes 235 and second sequences of phonemes 240 may be used to train the reconciler 175 to generate sequences of phonemes based on input sequences of phonemes and input i-vectors (and/or other vectors). Accordingly, the same input sequence of phonemes paired with a first i-vector may cause the reconciler 175 to output a different output sequence of phonemes than the same input sequence of phonemes with a second i-vector. In one embodiment, the reconciler 175 is trained using a modified training dataset 249 that includes modified training data items 238 that in combination cover a large number of different i-vectors and/or other vectors. Accordingly, the reconciler 175 may be trained to generate appropriate output sequences of symbols (e.g., output sequences of phonemes) for any specified i-vector (or other vectors).

Figure 2B:
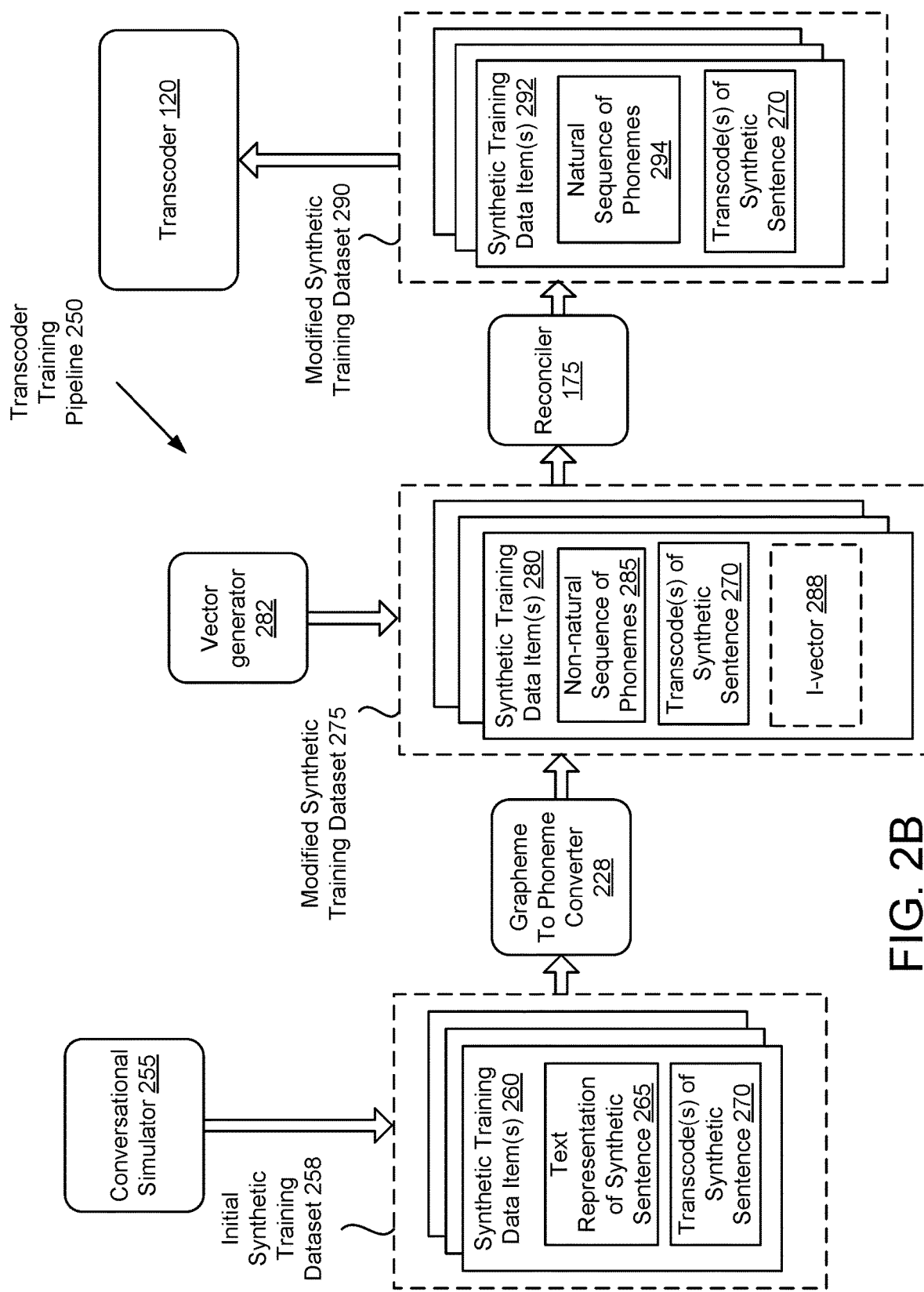
FIG. 2B is a block diagram illustrating a transcoder training pipeline, in accordance with embodiments of the present disclosure.

FIG. 2B is a block diagram illustrating a transcoder training pipeline 250, in accordance with embodiments of the present disclosure. The transcoder training pipeline 250 includes a machine learning model that is to be trained as a transcoder 120 that outputs one or more transcodes (e.g., sequences of transcodes) based on inputs of sequences of phonemes. In other embodiments, a reconciler 175 may be included in a NLU training pipeline.

In order for the transcoder 120 to be trained to output transcodes based on sequences of phonemes, a training dataset should include training data items that include both sequences of phonemes and transcodes, where the transcodes represent targets. However, there is generally insufficient audio data available within a particular domain to train the transcoder 120 to accurately generate transcodes for such a domain. Accordingly, in embodiments the transcoder training pipeline 250 includes a conversational simulator 255.

Conversational simulator 255 is a natural language generator that may be configured to generate synthetic sentences and associated descriptors (e.g., transcodes) that apply to a particular domain (e.g., fast food ordering, web travel booking, in-store kiosk, etc.). Each set of transcodes may include one or more actions and one or more associated entities. For example, in the domain of web travel bookings, actions may include book a trip, cancel a trip, and modify a trip, and associated entities may include flights, times, locations, and so on. The conversational simulator 255 may include a collection of grammar rules that are applied along with randomness (e.g., using a random number generator or pseudorandom number generator) to generate an initial synthetic training dataset 258 that includes a large corpus of synthetic training data items 260.

In one embodiment, the conversational simulator 255 includes a neural network or other machine learning model trained to generate plausible sentences within a restricted domain. In one embodiment, the conversational simulator 255 is a generative adversarial network (GAN) that generates synthetic training data items 260.

In one embodiment, the conversational simulator 255 includes a context-free grammar. A context-free grammar is a set of recursive rewriting rules used to generate patterns of strings. Each rule may cause an expansion from an initial object into one or more output objects. A context free grammar may include a set of terminal symbols, which are the characters of an alphabet that appear in the strings generated by the context-free grammar. The context free grammar may have a small set of rules that can be used to generate a very large number unique sentences. Each unique sentence may be generated by building a tree using one or more of the rules of the context-free grammar. The leaves of the tree may contain terminals that may form the string or sentence (e.g., sequence of words). In one embodiment, the context-free grammar has rules that generate text as well as rules that generate transcodes. Additionally, or alternatively, a single rule may generate both text (e.g., a string) as well as an associated transcode. Accordingly, the leaves of a tree formed using the context-free grammar may include a pair of sequences that include a sequence of text (the sentence) as well as a sequence of transcodes.

In an example, the context-free grammar may include a first rule for an order category. A tree may be created for an order, where the tree when completed will include a sequence of text and an associated sequence of transcodes. The context-free grammar may have a rule that expands the order category into an add, update or split category. The context-free grammar may also have a rule that causes expansion to an optional greeting, one or more regular expressions, joins, and so on. The context-free grammar may also have one or more rules that expand objects to one or more optional request phrases, optional pauses, and so on. The context-free grammar may also have one or more rules that expand objects to one or more noun phrases and/or verb phrases. The context-free grammar may also have one or more rules that expand objects to one or more post modifiers.

In a simple context-free grammar, there is no relationship between noun phrases and/or verb phrases. Such a lack of relationship can lead to sentences that are unreasonable within a particular domain. Accordingly, in embodiments the context-free grammar may include rules that generate variables which are terminals of the context-free grammar. Each of the variables may map to one or more lists of entities, lists of properties, lists of phrases (e.g., post modifiers) and so on. For example, a variable of food entities may map to a list or table of food items from a menu. In another example, a variable of hamburger options may map to a list of options for hamburgers, and may only be generated by the context-free grammar if a previous terminal of food entries has resolved to a hamburger. The variables and associated lists or tables that are used by the conversational simulator may be specific to a particular domain for which the conversational simulator is generating synthetic sentences.

The conversational simulator 255 may select an entity (e.g., an entry) from an appropriate list associated with a variable in a generated tree. Once the variable is replaced with an entity, the information on the selected entity may be used to limit options for other expansions and/or leaves on the tree, thereby reducing the range of options for the later expansions or leaves to those that are reasonable in association with the selected entity. Thus, information may be passed up and down the tree as it is generated by the context-free grammar. Accordingly, once a particular entity is selected, the conversational simulator 255 can limit the further grammar that can be created for a sentence to those that are reasonable in the context of the selected entity.

Particular selections of particular options when multiple options are available at a particular branch of a tree generated by the context-free grammar (e.g., at a particular expansion) may be random or pseudorandom selections based on the output of a random number generator or pseudorandom number generator. Similarly, selection of options from a list associated with a variable may be a random or pseudorandom selection based on the output of a random number generator or pseudorandom number generator. Some entities may have multiple different properties associated with them. Once such an entity is selected, later leaves in the tree may comprise values of one or more of the properties associated with the entity. Some entities with one or more properties may have default options for some or all of the properties. Such default options may be associated with a particular probability weight that causes those default options to be selected more often than alternative options (e.g., a weight of 70%, 80%, 90%, and so on). For each of the properties, the conversational simulator 255 may determine whether the default option is selected or an alternate option is selected using a pseudorandom number generator and a probability weight associated with a default option of the property. If a default option is selected for a property, then no text or associated transcode may be added to the tree for that property.

The grapheme to phoneme converter 228 converts the text representation of synthetic sentences 265 of synthetic training data items 260 output by the conversational simulator 255 into non-natural sequences of phonemes 285. Accordingly, after using the grapheme to phoneme converter 228 on the initial synthetic training dataset 258, a modified synthetic training dataset 275 is generated that includes synthetic training data items 280 that include non-natural sequences of phonemes 285 and associated transcodes of the synthetic sentence 270.

In some embodiments, the synthetic training data items 280 in the modified synthetic training dataset 275 are further modified by adding i-vectors 288 and/or other vectors representative of speaker characteristics, microphone/channel, noise characteristics, and so on. A vector generator 282 may be instructed to output an i-vector and/or other vector(s) representative of speech in particular geographic locations, age, gender, speaking speed/rate, accent, and so on. Alternatively, vector generator 282 may correspond to vector extractor 239, and audio data may be input into the vector generator 282. The vector generator 282 may then determine an i-vector and/or other vector(s) from the audio data. The generated or extracted i-vector 288 and/or other vector(s) may then be added to the synthetic training data items 280. In an example, the vector generator 282 may be provided with audio data of speakers from a particular geographic location, and may generate one or more i-vectors 288 from the audio data.

The synthetic training data items 280 from the modified synthetic training dataset 275 may be input into the reconciler 175. In particular, the non-natural sequences of phonemes 285 and optionally the i-vectors 288 and/or other vectors representative of speaker characteristics, channel, etc. may be input into the reconciler 175. The reconciler 275 may output natural sequences of phonemes 294. A modified synthetic training dataset 290 may be generated by replacing the non-natural sequence of phonemes 285 in synthetic training data items 292 with the natural sequence of phonemes 294. If particular i-vectors 288 and/or other vectors were input into the reconciler 175, then the output natural sequences of phonemes 294 may be based at least in part on those i-vectors 288 and/or other vectors. Accordingly, the reconciler 175 can convert sequences of phonemes representative of proper speech from a dictionary into sequences of phonemes representative of speakers from a particular geographic region, speakers with a particular accent, speakers of a particular age range, speakers speaking through a particular quality of microphone, and so on.

The modified synthetic training dataset 290 may be input into the transcoder 120 for training. The transcoder 120 may therefore be trained to determine the intent of speakers having particular characteristics and/or speakers speaking through microphones having particular characteristics. For example, the transcoder 120 can be trained to determine the intent of speakers from a particular geographic location, who may have very different speech patterns from speakers from other geographic locations. This enables the transcoder 120 to be quickly adapted to a new geographic location simply by collecting a few minutes or hours of speech of speakers from that geographic location, inputting that speech into vector generator 282, generating new i-vectors 288, feeding synthetic training data items with the new i-vectors 288 through reconciler 175, and training or retraining the transcoder 120 using the modified synthetic training dataset 290 that includes the natural sequence of phonemes 294 output by the reconciler 175.

Figure 3:
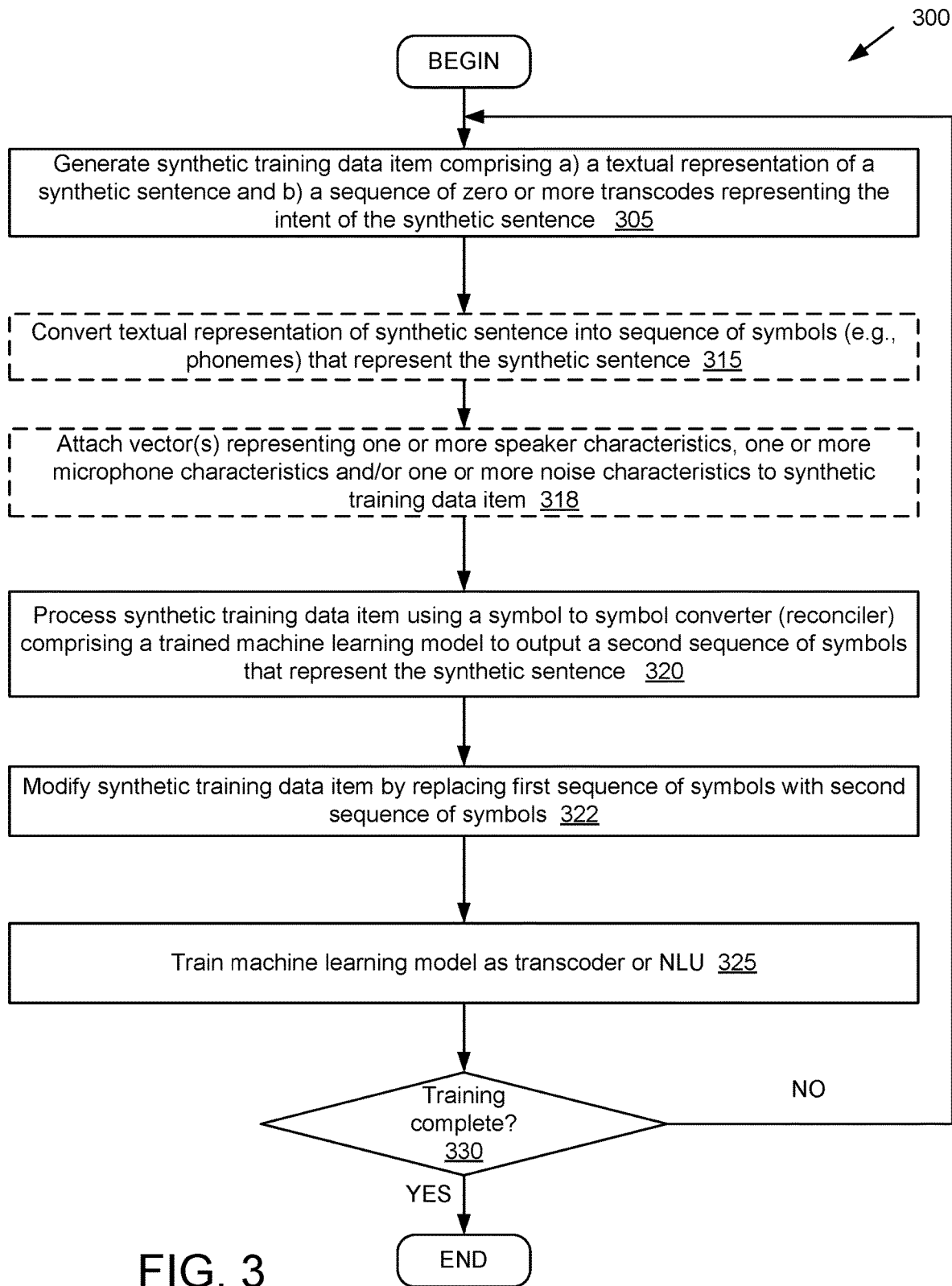
FIG. 3 is a flow diagram illustrating a method of training a machine learning model as a transcoder, in accordance with embodiments of the present disclosure.
Figure 4:
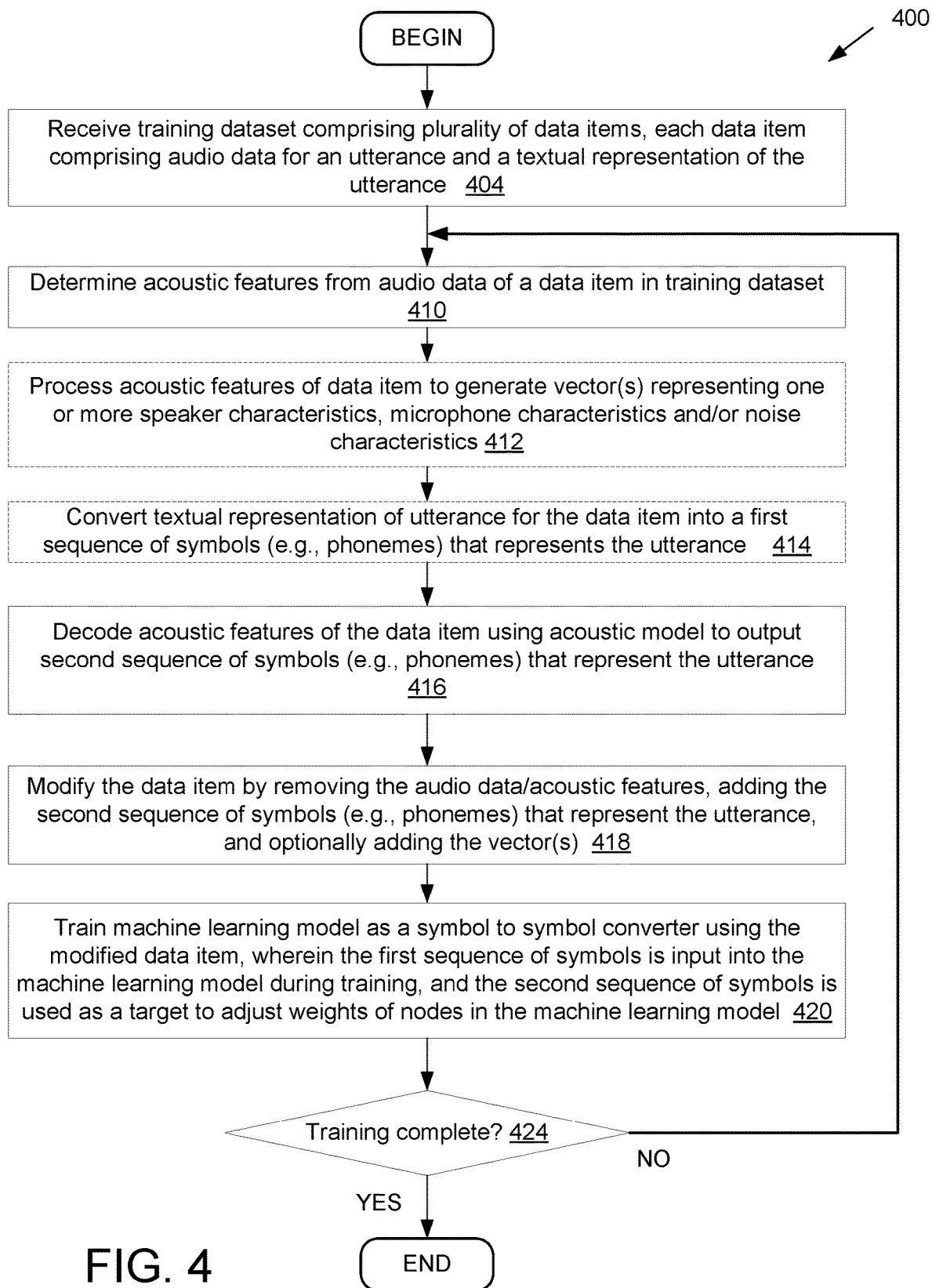
FIG. 4 is a flow diagram illustrating a method of training a machine learning model as a sequence to sequence converter (reconciler), in accordance with embodiments of the present disclosure.
Figure 5:
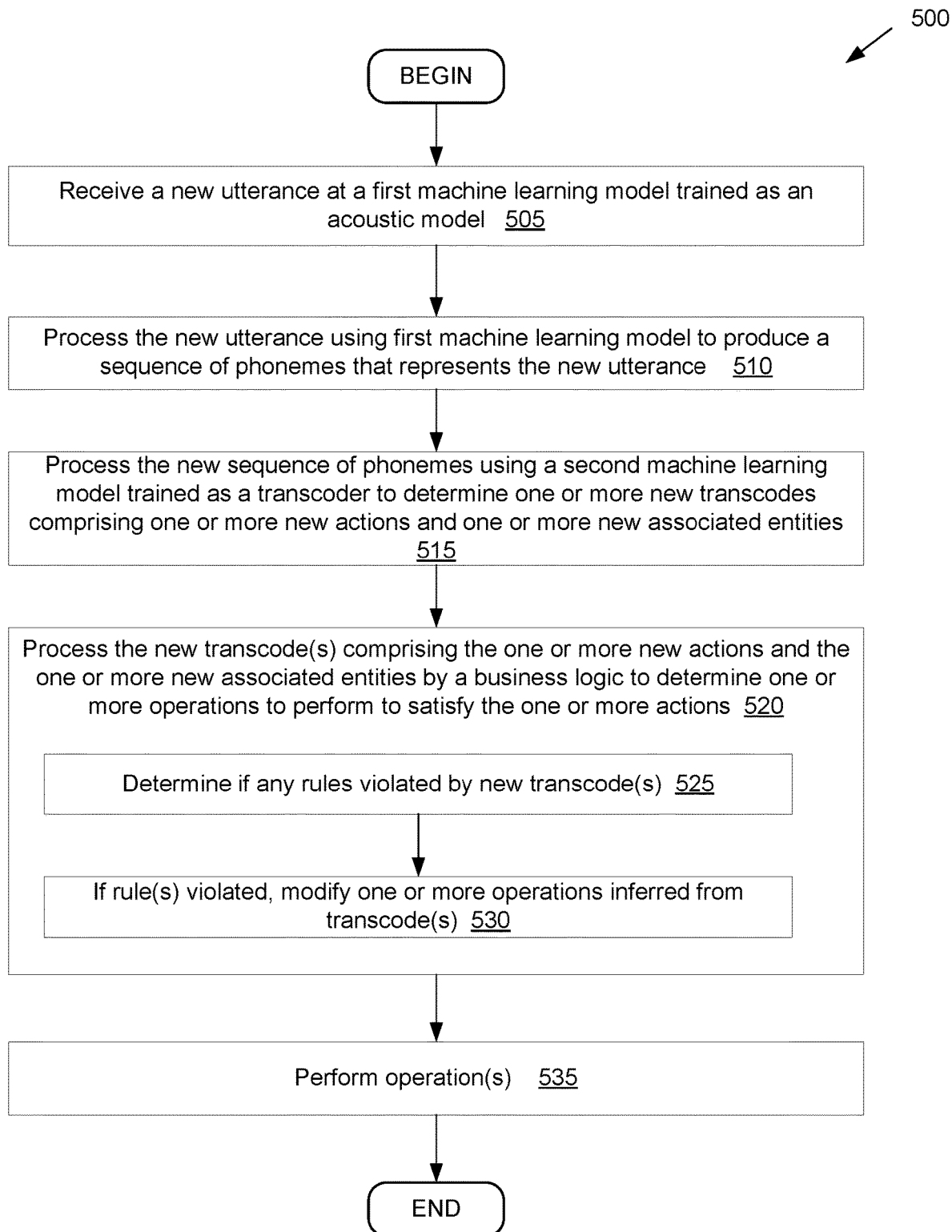
FIG. 5 is a flow diagram illustrating a method of determining a speaker's intent from audio input using a conversational agent, in accordance with embodiments of the present disclosure.

FIGS. 3-5 are flow diagrams illustrating methods for training a reconciler (sequence to sequence converter), methods for using such a reconciler to train a transcoder or NLU, and methods of applying audio data to a trained conversational agent to determine speaker intent, in accordance with embodiments of the present disclosure. The methods may be performed by processing logic that comprises hardware (e.g., circuitry, dedicated logic, programmable logic, microcode, etc.), software (e.g., instructions run on a processor), firmware, or a combination thereof. The methods may be performed, for example, by a computing device such as computing device 600 executing a conversational agent pipeline 682, a reconciler training pipeline 680 and/or a transcoder training pipeline 684 of FIG. 6.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 3 is a flow diagram illustrating a method 300 of training a machine learning model as a transcoder or NLU, in accordance with embodiments of the present disclosure. Method 300 may be performed, for example, using the transcoder training pipeline 250 of FIG. 2B in embodiments. At block 305, processing logic generates a synthetic training data item comprising a) a textual representation of a synthetic sentence (e.g., a sequence of text characters/words) and b) a corresponding sequence of zero or more transcodes representing the intent of the synthetic sentence using conversational simulator 255. For example, the synthetic sentence may be, "can I please have a hamburger with no pickles, oh, and please add extra onions," and the sequence of transcodes may be, "[order], [hamburger], [remove], [pickles], [add], [onions]" or "[add hamburger], [no pickles], [add onions]."

At block 315, processing logic may convert the textual representation (e.g., sequence of words) of the synthetic sentence into a sequence of phonemes that represent the synthetic sentence using graphene to phoneme converter 228. Alternatively, if an NLU that operates at the word level is used, then the operations of block 315 may be omitted.

At block 318, processing logic may attach one or more vectors representing one or more speaker characteristics, one or more microphone characteristics, one or more channel characteristics and/or one or more noise characteristics to the synthetic training data item. In one embodiment, an i-vector representative of a particular speaker characteristic or set of speaker characteristics is attached to the synthetic training data item. In one embodiment, the i-vector is chosen randomly to emulate random speaker and channel variation.

At block 320, processing logic processes the synthetic training data item (e.g., the sequence of phonemes and/or the attached i-vector of the synthetic training data item) using reconciler (sequence to sequence converter) 175. The reconciler 175 may convert word sequences to word sequences, syllable sequences to syllable sequences, or phoneme sequences to phonemes sequences, for example. The reconciler 175 may output a second sequence of symbols (e.g., a second sequence of phonemes) that represent the synthetic sentence.

At block 322, the synthetic data set is modified by replacing the first sequence of symbols (e.g., first sequence of phonemes) with the second sequence of symbols (e.g., second sequence of phonemes) output by the reconciler.

At block 325, processing logic may train one or more machine learning model as a transcoder 120 that determines sequences of transcodes from sequences of phonemes using the modified synthetic training data that includes the second sequence of symbols (e.g., phonemes) and the sequence of transcodes. Alternatively, processing logic may train an NLU that determines sequences of transcodes from sequences of words using the modified synthetic training data set that includes the second sequence of symbols (e.g., words) and the sequence of transcodes.

At block 330, processing logic determines whether training of the transcoder or NLU 20 is complete. Training may be complete if the transcoder or NLU 120 has a target level of accuracy. If training is not complete, the method returns to block 305 and another synthetic training data item is generated. If training is complete, the method ends.

FIG. 4 is a flow diagram illustrating a method 400 of training a machine learning model as a reconciler (sequence to sequence converter), in accordance with embodiments of the present disclosure. Method 400 may be performed, for example, using the reconciler training pipeline 200 of FIG. 2A in embodiments. At block 405 of method 400, processing logic receives a training dataset comprising a plurality of data items. Each data item in the training dataset may include audio data (e.g., an audio waveform) for an utterance and a textual representation of the utterance.

At block 410, processing logic determines acoustic features from the audio data of a data item in the training dataset. At block 412, processing logic may process the acoustic features of the data item to generate one or more vectors (e.g., an i-vector) representing one or more speaker characteristics, microphone characteristics and/or noise characteristics.

At block 414, a grapheme to phoneme converter 228 may convert the textual representation of the utterance (e.g., sequence of text words) for a data item into a sequence of symbols (e.g., a sequence of phonemes) that represent the utterance. At block 416, an acoustic model processes (decodes) the acoustic features of the data item to output a second sequence of symbols (e.g., second sequence of phonemes) that represent the utterance. At block 418, processing logic modifies the data item by removing the audio data/acoustic features, adding the second sequence of symbols (e.g., second sequence of phonemes) that represent the utterance, and optionally adding the one or more vectors (e.g., i-vector) to the data item.

At block 420, processing logic trains a machine learning model, using the modified data item, as a reconciler (sequence to sequence converter) that reconciles the output of the acoustic model or ASR with the output of the simulator and/or grapheme to phoneme converter. The first sequence of symbols may be input into the machine learning model during training (optionally with the one or more vectors), and the second sequence of symbols may be used as a target to adjust weights of nodes in the machine learning model during the training.

At block 424, processing logic determines whether training is complete. If training is complete, the method ends. If training is not complete, the method returns to block 410, and another training data item is processed.

FIG. 5 is a flow diagram illustrating a method 500 of determining a speaker's intent from audio data using a conversational agent (e.g., conversational agent pipeline 100B), in accordance with embodiments of the present disclosure. At block 505, processing logic receives a new utterance (e.g., an audio waveform of an utterance) at a first machine learning model trained as an acoustic model 110. At block 510, processing logic processes (decodes) the new utterance (e.g., acoustic features from the audio waveform of the utterance) using the first machine learning model to produce a sequence of phonemes that represent the new utterance.

At block 515, processing logic processes the new sequence of phonemes using a second machine learning model trained as a transcoder 120 to determine one or more new transcodes comprising one or more new actions and one or more associated entities. The transcoder 120 may have been trained using synthetic training data modified by reconciler 175. At block 520, processing logic processes the new transcodes comprising the one or more new actions and the one or more new associated entities using a business logic 130 to determine or more operations to perform to satisfy the one or more actions. In one embodiment, the business logic determines if any rules are violated by the new transcodes at block 525. If any rules are violated, processing logic may modify one or more operations inferred from of the transcodes at block 530. The business logic may also determine that a speaker intent is ambiguous from the transcodes and output an inquiry. At block 535, the business logic may perform the one or more determined operations to satisfy a speaker intent.

Figure 6:
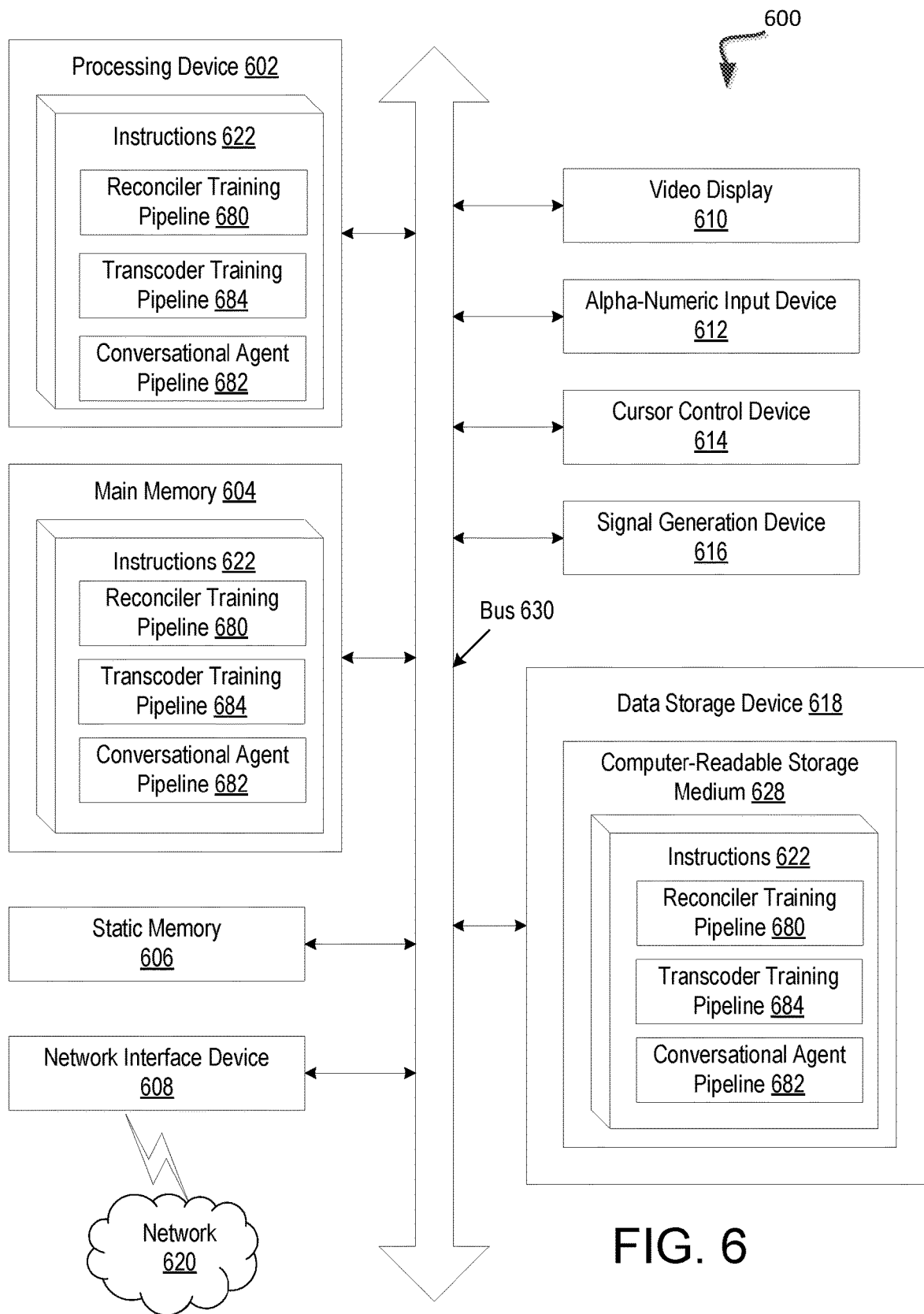
FIG. 6 is a block diagram illustrating an exemplary computer system, in accordance with embodiments of the present disclosure.

FIG. 6 illustrates a diagrammatic representation of a machine in the exemplary form of a computing device 600 within which a set of instructions, for causing the machine to perform any one or more of the methodologies discussed herein, may be executed. The computing device 600 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing device 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of reconciler training pipeline 680, transcoder training pipeline 684 and/or conversational agent pipeline 682) embodying any one or more of the methodologies or functions described herein. Conversational agent pipeline 682 may correspond to conversational agent pipeline 100B of FIG. 1B in embodiments. Reconciler training pipeline 680 may correspond to reconciler training pipeline 200 of FIG. 2A in embodiments. Transcoder training pipeline 684 may correspond to transcoder training pipeline 250 of FIG. 2B in embodiments. The instructions 622 may also reside, completely or at least partially, within the main memory 604 and/or the processing device 602 during execution thereof by the computer system 600, the main memory 604 and the processing device 602 also constituting computer-readable media. Though a single computing device 600 is shown that includes conversational agent pipeline 682, reconciler training pipeline 680 and transcoder training pipeline 684, each of these pipelines may resides on separate computing devices. Additionally, each of the separate computing devices may be multiple computing devices that operate together (e.g., a cluster of computing devices) to implement one or more of the methodologies or functions described herein.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies described herein. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring embodiments of the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying", "converting", "training", "determining", "receiving", "processing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by at least one processing device, a synthetic training data item comprising one or more transcodes and a first sequence of symbols that represent a synthetic sentence output by a simulator;
   processing, by the at least one processing device, the synthetic training data item using a sequence to sequence converter comprising a first machine learning model to output a second sequence of symbols that represent the synthetic sentence;
   modifying, by the at least one processing device, the synthetic training data item by replacing the first sequence of symbols with the second sequence of symbols, wherein a statistically significant mismatch exists between the first sequence of symbols and a third sequence of symbols that would be output by an acoustic model that processes a set of acoustic features that represent an utterance of the synthetic sentence, and wherein no statistically significant mismatch exists between the second sequence of symbols and the third sequence of symbols; and
   training, by the at least one processing device, a second machine learning model to function as a transcoder of a conversational agent using the modified synthetic training data item, wherein the second sequence of symbols is used as an input to the second machine learning model during the training, wherein the one or more transcodes are used as a target to adjust weights of nodes in the second machine learning model during the training, and wherein use of the modified synthetic training data item rather than the synthetic training data item to train the second machine learning model as the transcoder increases an accuracy of the conversational agent.

2. The method of claim 1, further comprising:
   generating the synthetic training data item by the simulator, wherein the synthetic training data item comprises a) a textual representation of the synthetic sentence and b) the one or more transcodes of the synthetic sentence comprising one or more actions and one or more entities associated with the one or more actions included in the synthetic sentence; and
   converting the textual representation of the synthetic sentence of the synthetic training data item into the first sequence of symbols.

3. The method of claim 2, wherein the transcoder determines transcodes comprising actions and associated entities from sequences of phonemes, wherein the training is performed using a training dataset comprising the modified synthetic training data item and a plurality of additional modified synthetic training data items, wherein the modified synthetic training data item comprises a) the second sequence of symbols and b) the one or more transcodes of the synthetic sentence.

4. The method of claim 3, further comprising:
   receiving acoustic features of a new utterance at the acoustic model;
   processing the acoustic features of the new utterance using the acoustic model to produce a new sequence of symbols that represents the new utterance;
   processing the new sequence of symbols using the second machine learning model trained as the transcoder to determine one or more new transcodes comprising one or more new actions and one or more new associated entities;
   processing the one or more new transcodes comprising the one or more new actions and the one or more new associated entities by a business logic to determine one or more operations to perform to satisfy the one or more actions; and
   performing the one or more operations.

5. The method of claim 1, wherein the first sequence of symbols comprises a first sequence of phonemes and the second sequence of symbols comprises a second sequence of phonemes.

6. The method of claim 1, wherein the first sequence of symbols comprises a first sequence of syllables and the second sequence of symbols comprises a second sequence of syllables.

7. The method of claim 1, wherein the first sequence of symbols comprises a first sequence of words and the second sequence of symbols comprises a second sequence of words.

8. The method of claim 1, wherein the acoustic model comprises a third machine learning model that generates sequences of symbols from acoustic features derived from acoustic data of utterances.

9. The method of claim 1, wherein the synthetic training data item further comprises at least one of a) one or more speaker characteristics, b) one or more microphone characteristics or c) one or more noise characteristics, wherein the sequence to sequence converter receives as an input the first sequence of symbols and at least one of a) the one or more speaker characteristics, b) the one or more microphone characteristics or c) the one or more noise characteristics, and wherein the second sequence of symbols is based at least in part on a) the one or more speaker characteristics, b) the one or more microphone characteristics or c) the one or more noise characteristics.

10. A system comprising:
    at least one memory; and
    at least one processing device operatively coupled to the at least one memory, the at least one processing device to:
    receive a synthetic training data item comprising one or more transcodes and a first sequence of symbols that represent a synthetic sentence output by a simulator;
    process the synthetic training data item using a sequence to sequence converter comprising a first machine learning model;
    output a second sequence of symbols that represent the synthetic sentence by the first machine learning model based on a result of processing of the synthetic training data item;
    modify the synthetic training data item by replacing the first sequence of symbols with the second sequence of symbols, wherein a statistically significant mismatch exists between the first sequence of symbols and a third sequence of symbols that would be output by an acoustic model that processes a set of acoustic features that represent an utterance of the synthetic sentence, and wherein no statistically significant mismatch exists between the second sequence of symbols and the third sequence of symbols; and train a second machine learning model to function as a transcoder of a conversational agent using the modified synthetic training data item, wherein the second sequence of symbols is used as an input to the second machine learning model during training, wherein the one or more transcodes are used as a target to adjust weights of nodes in the second machine learning model during the training, and wherein use of the modified synthetic training data item rather than the synthetic training data item to train the second machine learning model as the transcoder increases an accuracy of the conversational agent.

11. The system of claim 10, wherein the at least one processing device is further to:

generate the synthetic training data item by the simulator, wherein the synthetic training data item comprises a) a textual representation of the synthetic sentence and b) the one or more transcodes of the synthetic sentence comprising one or more actions and one or more entities associated with the one or more actions included in the synthetic sentence; and convert the textual representation of the synthetic sentence of the synthetic training data item into the first sequence of symbols.

12. The system of claim 11, wherein the transcoder is trained to determine transcodes comprising actions and associated entities from sequences of phonemes, wherein the training is performed using a training dataset comprising the modified synthetic training data item and a plurality of additional modified synthetic training data items, wherein the modified synthetic training data item comprises a) the second sequence of symbols and b) the one or more transcodes of the synthetic sentence.

13. The system of claim 10, wherein the first sequence of symbols comprises a first sequence of phonemes and the second sequence of symbols comprises a second sequence of phonemes.

14. The system of claim 10, wherein the acoustic model comprises a third machine learning model that generates sequences of symbols from acoustic features derived from acoustic data of utterances.

15. The system of claim 10, wherein the synthetic training data item further comprises one or more speaker characteristics, wherein the sequence to sequence converter receives as an input the first sequence of symbols and the one or more speaker characteristics, and wherein the second sequence of symbols is based at least in part on the one or more speaker characteristics.

16. The method of claim 1, wherein the first machine learning model comprises a recurrent neural network (RNN).

17. The method of claim 16, wherein the RNN is an encoder-decoder RNN.

18. The method of claim 16, wherein the RNN is a long short term memory (LSTM) neural network.

19. The method of claim 1, wherein the second machine learning model comprises a recurrent neural network (RNN).

20. The method of claim 19, wherein the RNN is a long short term memory (LSTM) neural network that uses a connectionist temporal classification (CTC) loss function.

* * * * *